Aug. 5, 1958 W. J. PORTER 2,846,088

LOADING PLATFORMS FOR MECHANICAL PARKING SYSTEMS

Filed Sept. 13, 1955 9 Sheets-Sheet 1

INVENTOR.
William J. Porter
BY [signature]
Atty.

LOADING PLATFORMS FOR MECHANICAL PARKING SYSTEMS

Filed Sept. 13, 1955 9 Sheets-Sheet 2

INVENTOR.
William J. Porter
BY Grub Wells
Atty.

Aug. 5, 1958 W. J. PORTER 2,846,088

LOADING PLATFORMS FOR MECHANICAL PARKING SYSTEMS

Filed Sept. 13, 1955 9 Sheets-Sheet 3

INVENTOR.
William J. Porter
BY [signature]
Atty.

LOADING PLATFORMS FOR MECHANICAL PARKING SYSTEMS

Filed Sept. 13, 1955 9 Sheets-Sheet 4

INVENTOR.
William J Porter
BY [signature]
Atty.

INVENTOR.
William J. Porter
BY
[signature]
Atty.

INVENTOR.
William J. Porter
BY Greek Wells
Atty.

Aug. 5, 1958 W. J. PORTER 2,846,088

LOADING PLATFORMS FOR MECHANICAL PARKING SYSTEMS

Filed Sept. 13, 1955 9 Sheets-Sheet 7

INVENTOR.
William J. Porter
BY
Stebbins Wells
Atty.

INVENTOR.
William J. Porter
BY [signature]
Atty.

Aug. 5, 1958 W. J. PORTER 2,846,088

LOADING PLATFORMS FOR MECHANICAL PARKING SYSTEMS

Filed Sept. 13, 1955 9 Sheets-Sheet 9

INVENTOR.
William J. Porter
BY [signature]
Atty.

United States Patent Office 2,846,088

Patented Aug. 5, 1958

2,846,088

LOADING PLATFORMS FOR MECHANICAL PARKING SYSTEMS

William J. Porter, Spokane, Wash., assignor to Parkmaster Systems Inc., Spokane, Wash., a corporation of Washington Application September 13, 1955, Serial No. 533,955

10 Claims. (Cl. 214—16.1)

The present invention relates to improvements in loading platforms for mechanical parking systems.

In congested areas where ground space available for parking automobiles is considerably less than that needed, mechanical parking devices have become popular. These devices utilize two spaced apart vertical structures each having several tiers of parking stalls therein for storing automobiles. An elevator tower is provided between the structures and constructed to move laterally between them. The tower has an elevator therein which receives and transports the automobiles to and from the stalls. The elevator is provided with shuttle means capable of travelling out to pick up or deliver the vehicles. In the use of such devices, problems arise in connection with the loading of the vehicles from the entrance platform onto the elevator. Since the shuttle means must move in a straight line out from the elevator and under the vehicle, a problem of proper alignment arises. The vehicle must rest on the loading platform so that its longitudinal center line coincides exactly with the line of travel of the shuttle means in order for the shuttle to operate. If the vehicle is angularly disposed even a slight amount, then the shuttle cannot pass under it for its full length as is required.

A second problem that arises is that of the possibility of a vehicle getting out of control and rolling forward off the platform and into the elevator pit between the stall structures, doing damage both to the vehicle and the parking mechanism.

The principal purpose of this invention is to provide a vehicle loading platform for mechanical parking devices which will automatically align a vehicle driven thereon so that it may be loaded and transported to the elevator of the device without necessitating any attention by the attendants or the vehicle driver.

A further purpose of the invention is to provide wheel chock means on the loading platform which will prevent a vehicle driven on the platform from passing thereover and into the elevator pit, yet which are depressed upon passage of the shuttle means beneath the vehicle whereby to permit the vehicle to be transported to the elevator.

The nature and advantages of my invention will appear more clearly from the following description and the accompanying drawings wherein a preferred form of the invention is shown. The drawings and description are illustrative only, however, and are not intended to limit the invention except insofar as it is limited by the claims.

Figure 1:
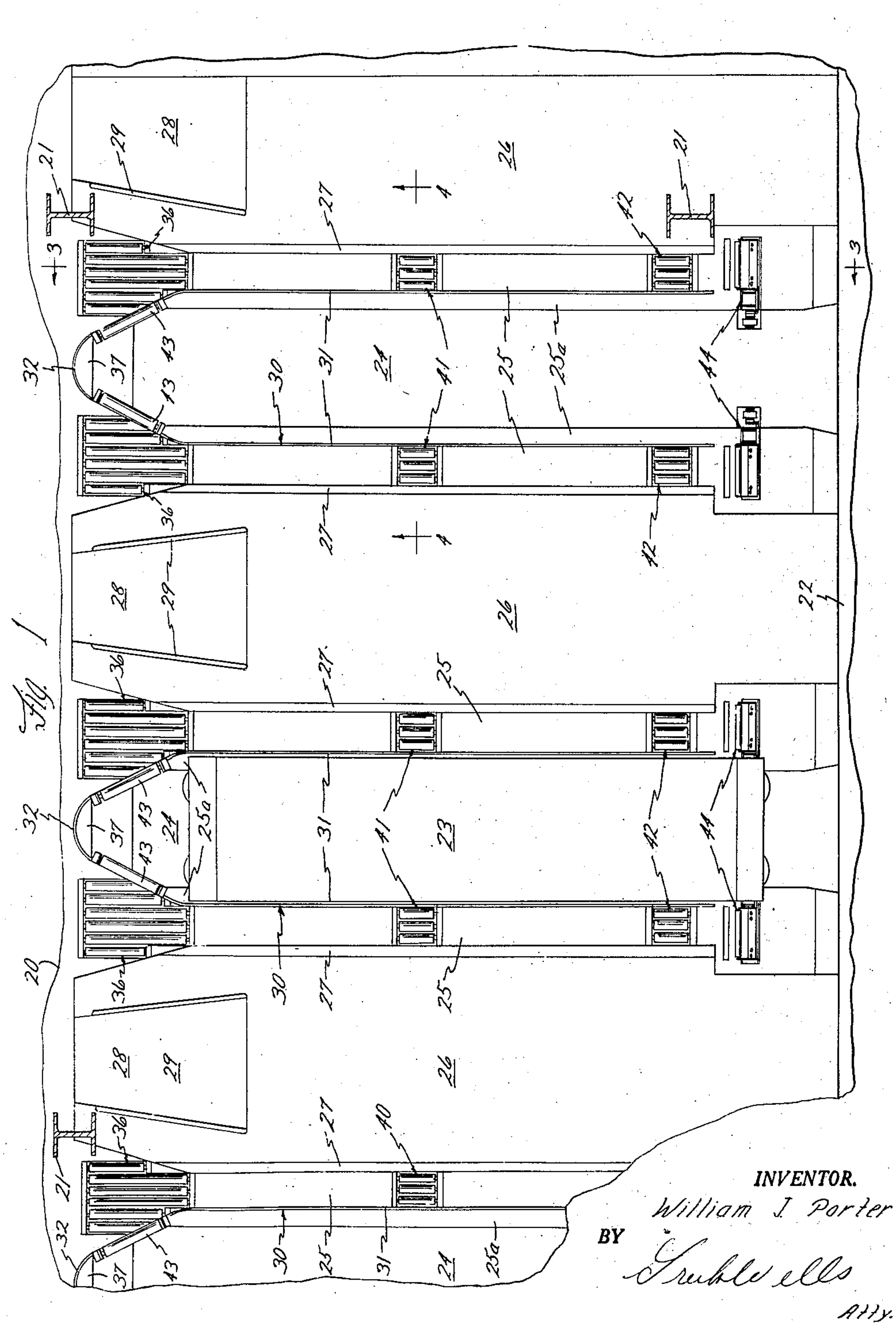
Figure 1 is a somewhat diagrammatic plan view of the lobby floor of a mechanical parking device embodying my invention.

Referring now to the drawings, my invention is shown as embodied in a mechanical parking device similar to that disclosed in the co-pending application, Ser. No. 382,543 to Royal N. Riblet, filed September 28, 1953, now Patent No. 2,785,809. The device (not shown in full) comprises two spaced apart parking stall structures which have several tiers of parking stalls therein with an elevator pit between them. An elevator tower is mounted in the pit for lateral movement along the adjacent faces of the parking stall structures. The tower carries an elevator therein which is capable of vertical movement from the lowest level of stalls to the highest. Shuttle vehicles are included and travel from the elevator to the stalls. The shuttles are designed to travel longitudinally between the wheels of a vehicle and have a lifting platform thereon which may be raised to lift a vehicle off its wheels so that it may be carried to and from the elevator.

Figure 3:
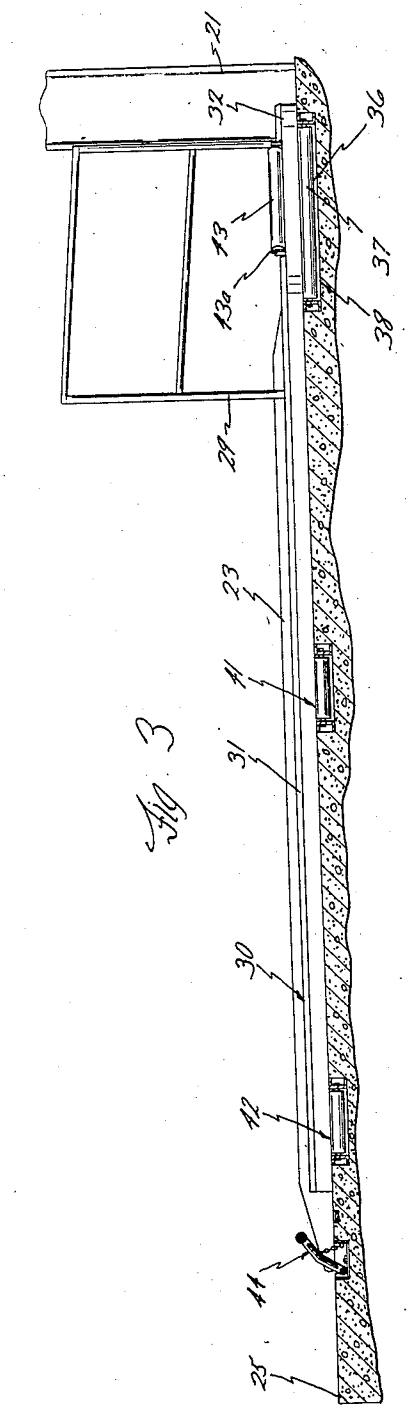
Figure 3 is an enlarged longitudinal sectional view taken on the line 3—3 of Figure 1.

As shown in Figure 1, a lobby floor 20 is provided in one of the parking stall structures, the supports of which are indicated at 21. The lobby floor 20 is a concrete floor positioned at the street level of the structure. Ingress and egress means are provided from the lobby to the street. The lobby 20 extends the full depth of the structure from the street side to the elevator pit which is indicated by the numeral 22 in the drawings. A vehicle to be parked is driven into the lobby 20 and stopped a short distance from the pit 22, facing it. The elevator is then leveled with the lobby floor and aligned with the vehicle. The shuttle indicated at 23 in Figures 1 and 3, moves out under the vehicle and picks it up. In the parking device disclosed in the above mentioned application, the shuttle vehicles are designed to travel on raised tracks or on the sides of a shallow trench. The shuttle, as shown in my co-pending application, Ser. No. 509,539, filed May 19, 1955, has a central portion which extends below the supporting wheels and which depends into the trench or between the rails.

Figure 4:
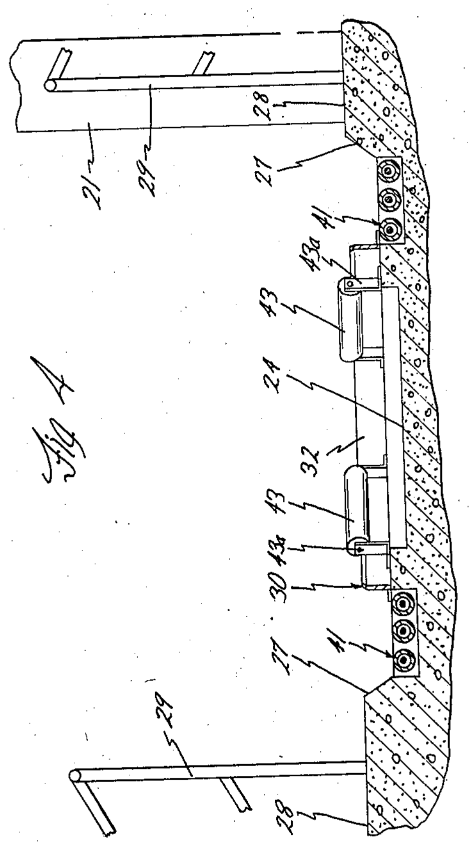
Figure 4 is an enlarged lateral sectional view taken on the line 4—4 of Figure 1.

In order to provide for entry of the shuttles 23 into the lobby 20, I provide a plurality of trenches 24 extending from the pit 22 into the lobby for a distance slightly greater than the length of a vehicle. On each side of each trench 24 a narrow level space 25 is left in the lobby floor 20 to provide a track for the vehicle wheels. At the edges of the spaces 25, the lobby floor is raised a few inches to provide pedestrian platforms 26 for people to enter and leave their vehicles. As best shown in Figure 4, sloping walls 27 are formed at the outer edges of the spaces 25. The walls 27 slope up to the pedestrian platforms 26 and provide guides for the vehicle tires to assist in aligning the vehicle as it is driven into place. The raised pedestrian platforms 26 have inclined ramps 28 leading therefrom to the lobby floor 20, each ramp 28 having a guard rail 29 at each side to prevent pedestrians from entering the vehicle lanes.

Persons wishing to park their vehicles in the parking device, drive onto the lobby floor 20 and guide their vehicles into place over the trenches 24. To enable the shuttle 23 to pass beneath the vehicle so positioned, the vehicle must be properly aligned. To accomplish this without necessitating precise manipulation by the driver of the vehicle, I provide an automatic aligning mechanism for each trench 24.

Figure 2:
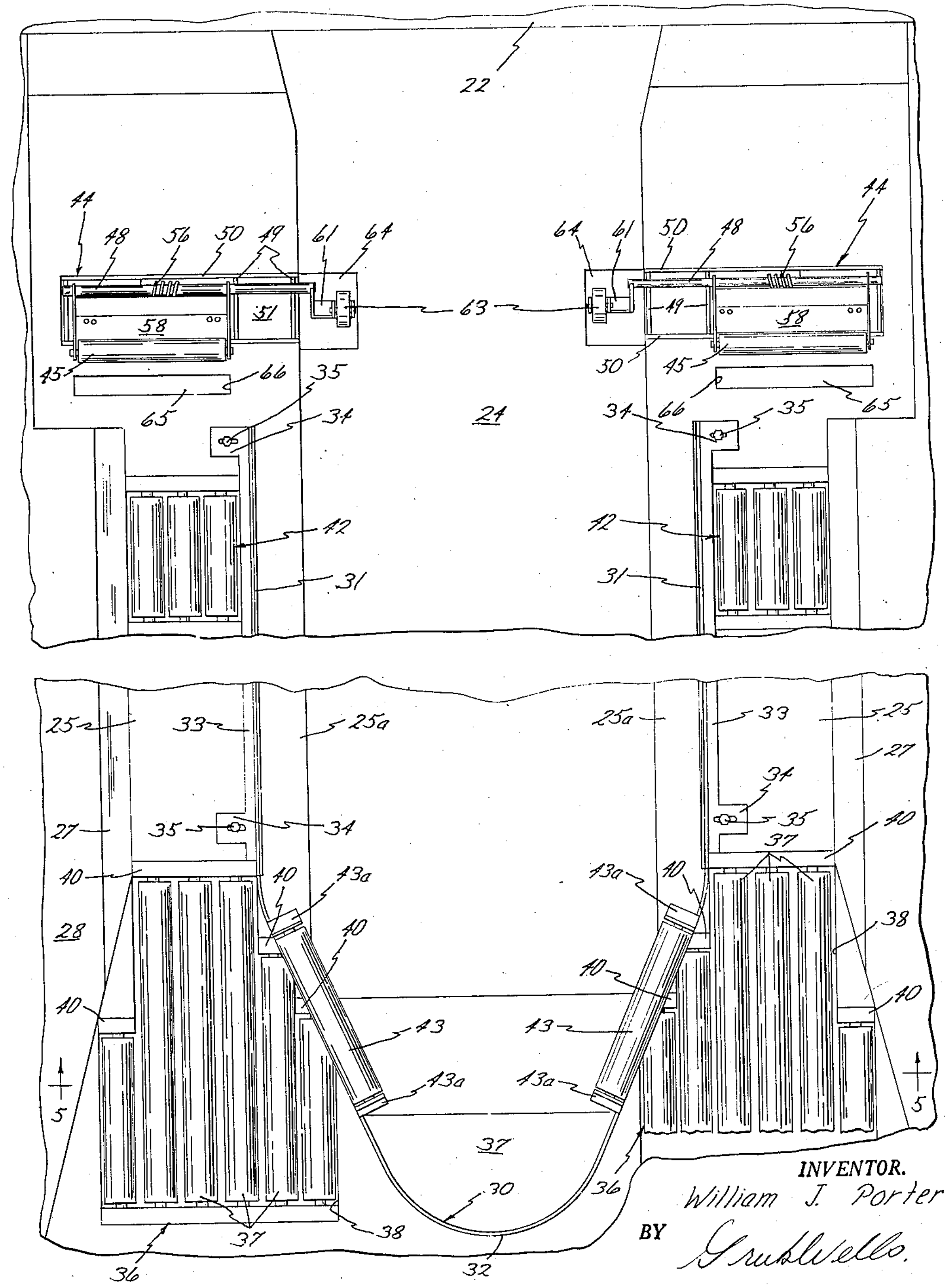
Figure 2 is an enlarged plan view of one of the vehicle loading platforms positioned in the lobby.

Positioned around the side and rear edges of each of the trenches 24 is a tire guide 30. The guide 30 is comprised of a long metal strip bent into a U-shape so that it has two straight leg portions 31 connected by a curved portion 32. The leg portions 31 have a lower horizontal flange 33 thereon by which they are secured to the concrete floor. As shown best in Figure 2, mounting ears 34 are provided in the flange 33 through which anchor bolts 35 extend. The portions 31 of the guide 30 are positioned parallel to the sides of the trench 24 on the spaces 25, but spaced outwardly a short distance to provide tracks 25*a* for the wheels of the shuttle 23. The total distance between the portions 31 of the guide 30 is slightly less than that between the tires of a standard domestic automobile. The curved portion 32 of the guide 29 is positioned behind the rear edge of the trench 24. A concrete fill 37 is formed inside the curved portion 32 to strengthen it.

Figure 5:
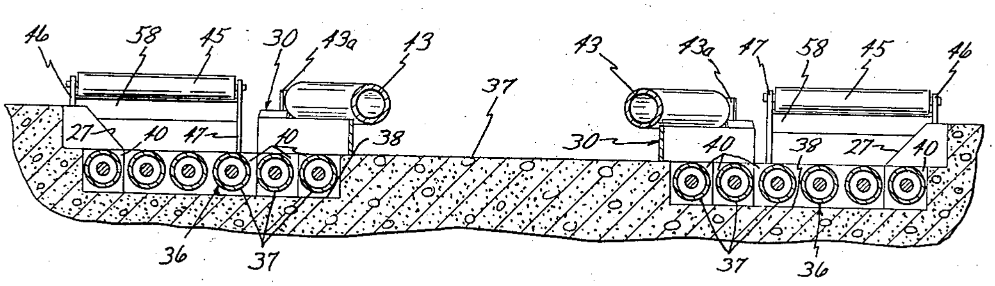
Figure 5 is a sectional view taken on the line 5—5 of Figure 2.

With the construction just described, a vehicle guided toward the trench 24 with enough accuracy to avoid striking the rearmost tip of the curved portion 32 of the guard 30 at right angles, will be guided into proper alignment by the guide 30 and the sloping walls 27. If the wheels strike the guide 30, it will deflect them and turn the vehicle to the proper course. To assist the guide 30 in deflecting the vehicle's tires to the proper course, a horizontal roller assembly 36 is provided in each of the spaces 25 adjacent the rear edge of the trench 24. The roller assemblies 36, best shown in Figures 2, 3 and 5, comprise a plurality of longitudinally aligned rollers 37 rotatably mounted in shallow depressions 38 formed in the concrete. At the rear edge of the depressions 38, a transverse channel 39 is positioned in which the rollers 37 are rotatably mounted. The rollers 37 are of varying length, the center rollers being longer than those at each side, so a plurality of short channel members 40 are provided to support the front ends thereof. The depression 38 is of such a depth that the upper surface of the rollers is at the same level as the floor.

As shown in Figure 1, additional roller assemblies 41 and 42, constructed similar to the assemblies 36, are positioned in each of the spaces 25, the assemblies 41 being positioned near the midpoint of the trench 24 and the assemblies 42 near the front of the trench 24.

In order to prevent unnecessary damage to the tires if they strike the curved portion 32 of the guide 30, deflection rollers 43 are provided which extend above the portion 32 to engage and deflect the tires without injury. The deflection rollers 43 are rotatably mounted in brackets 43*a* which are secured to the concrete adjacent the inner face of the curved portion 32 of the guide 30.

The roller assemblies 36, 41 and 42 and the deflection rollers 43 operate efficiently to guide a vehicle into proper alignment with the trench 24. When a vehicle is guided toward the trench 24, its front wheels pass onto the roller assemblies 36 at each side of the portion 32 of the guide 30. If the wheels are too far to one side or the other, they engage the freely rotatable rollers 42 or 43 and as forward motion is continued, they are forced sidewise over the rotatable roller assemblies 36. The front wheels are then aligned with the spaces 25 and continue forward, being kept in alignment by the portions 31 of the guide 30. When the wheels reach the roller assemblies 41, they again are moved sidewise if one has crowded against one of the portions 31 too much. The rear wheels of the vehicle are aligned in a like manner, being deflected by the rollers 42 and 43 and moving into alignment on the rollers 37 of the assemblies 36.

It is necessary to provide some means on the spaces 25 to stop the vehicle over the trench 24 and to prevent accidental entry of the vehicle into the elevator pit 22, in case the driver loses control. This means must always remain raised when vehicles are being driven into position over the trench 24, but must be lowered when the shuttle 23 is transporting a vehicle to or from the elevator. According to my invention, a wheel chock device 44 is provided in each of the spaces 25 between the elevator pit 22 and the roller assembly 42. The wheel chock devices are identical except that one is a right hand member and the other a left hand member, so it is believed that a description of one will suffice for both.

Figure 6:
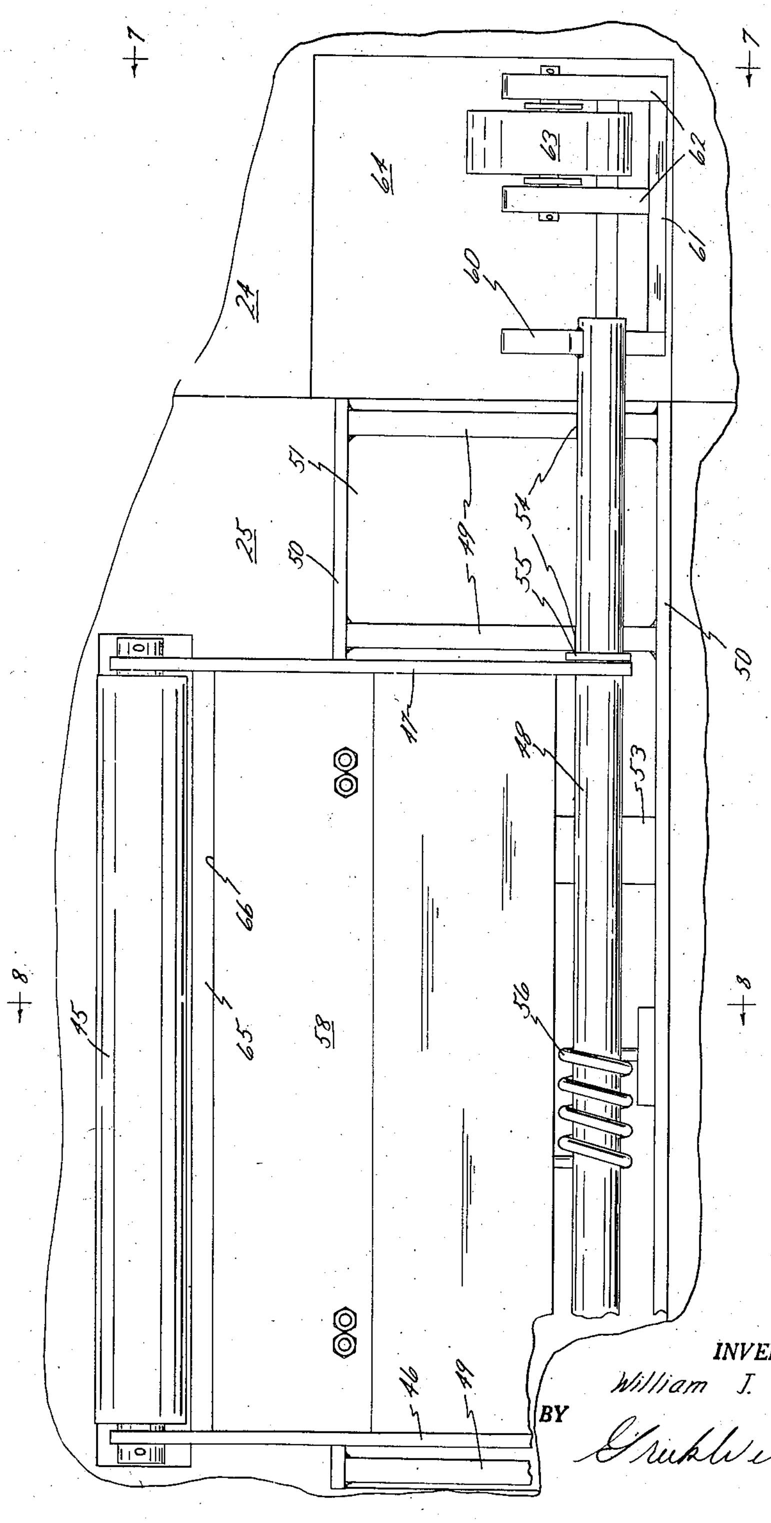
Figure 6 is an enlarged plan view of one of the wheel chock devices included in my invention.
Figure 7:
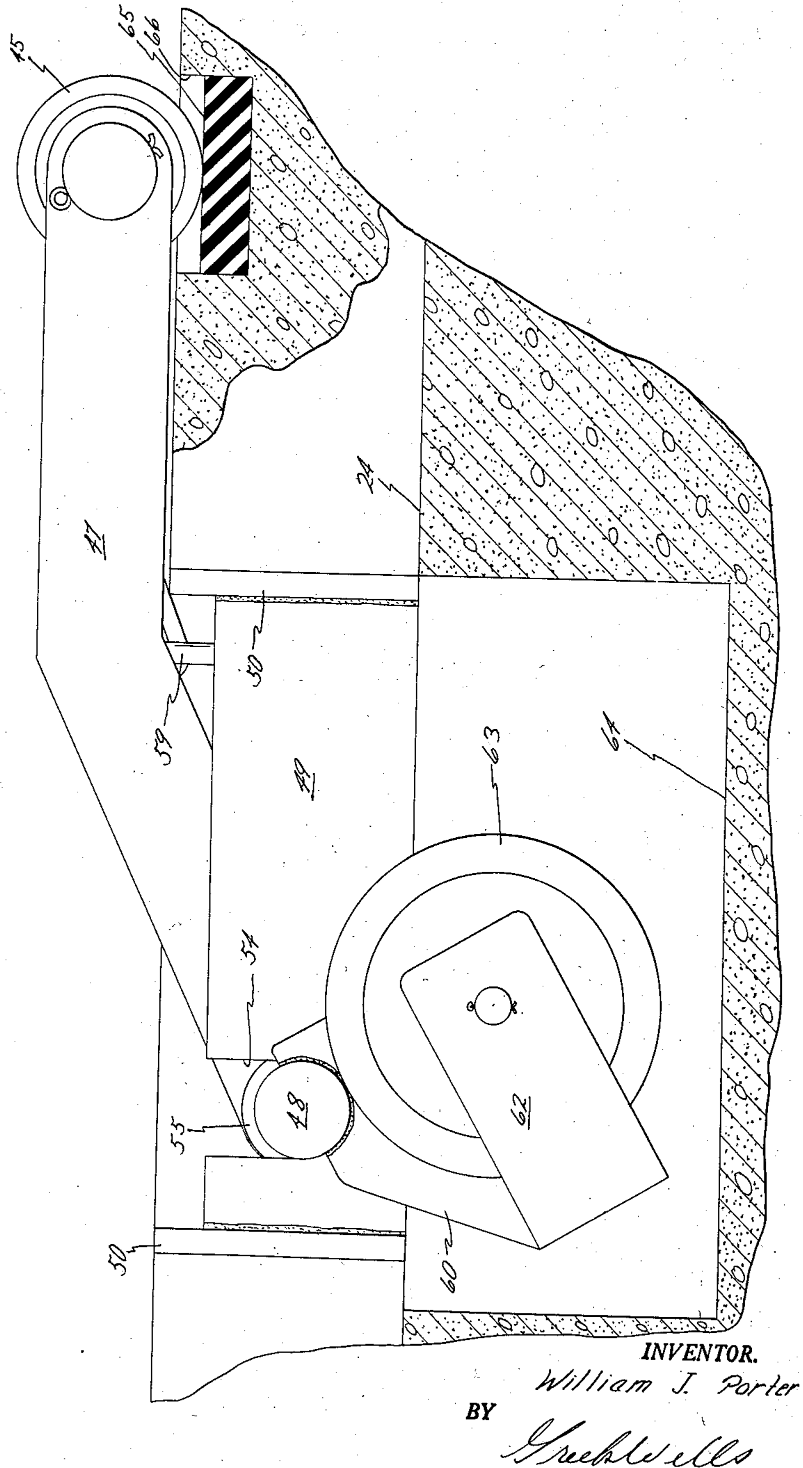
Figure 7 is an enlarged sectional view taken on the line 7—7 of Figure 6.
Figure 8:
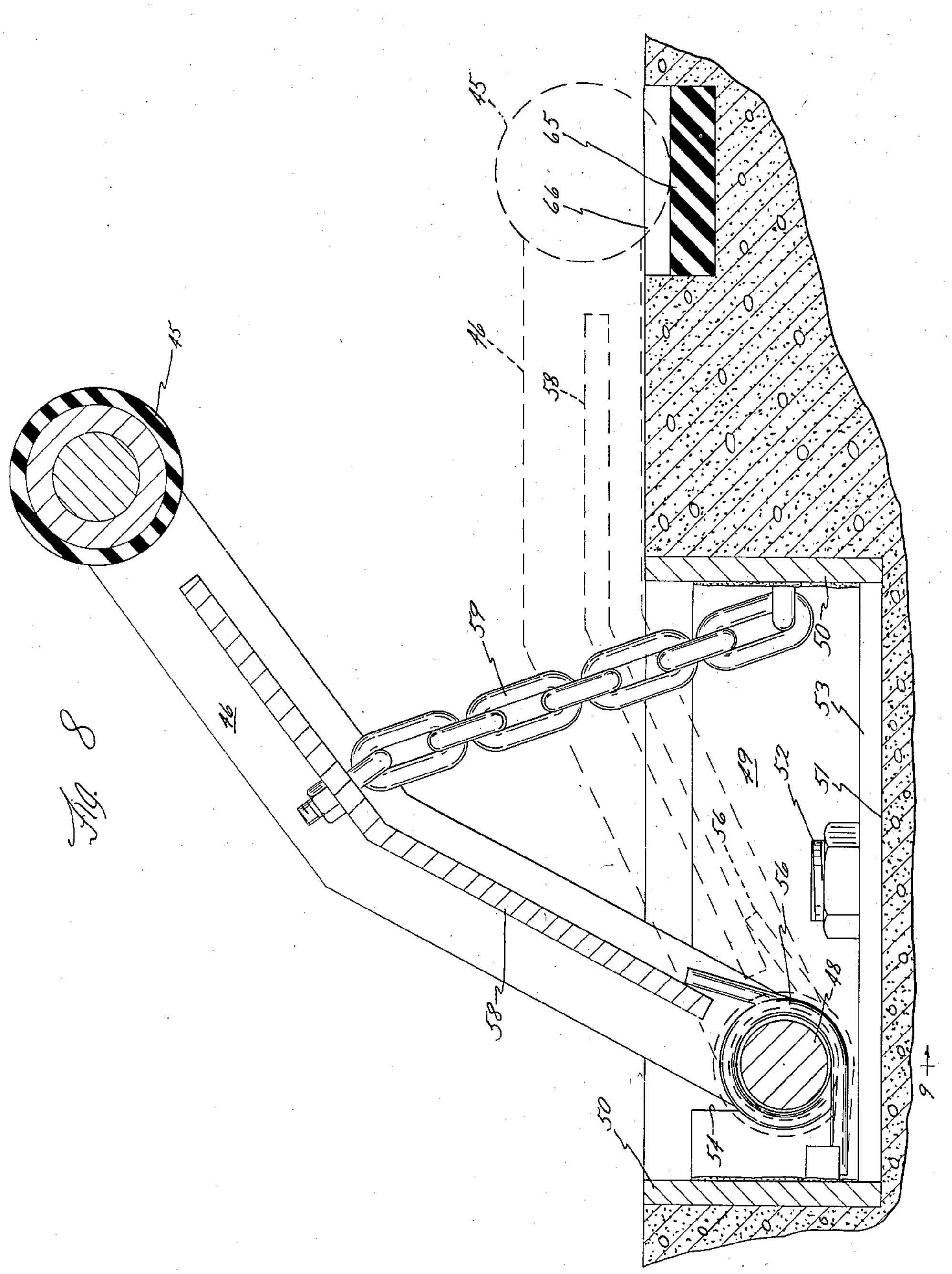
Figure 8 is an enlarged sectional view taken on the line 8—8 of Figure 6, but showing the wheel chock device in the raised position.

The wheel chock device 44, the construction of which is best illustrated in Figures 6, 7 and 8, comprises a chock roller 45 rotatably mounted at the ends of a pair of chock roller arms 46 and 47. The arms 46 and 47 are secured rigidly to a shaft 48 which is rotatably mounted in bearing plates 49. The plates 49 are tied together at their ends by frame members 50. The bearing plates 49 and frame members 50 reside in a shallow depression 51 formed in the concrete of the space 25. Anchor bolts 52, extending through straps 53 between the members 50, secure the wheel chock devices 44 in place. The shaft 48 is seated in notches 54 formed in the bearing plates 49, and extends transversely into the trench 24. Spacer washers 55 on the shaft 48 between the arms 46 and 47 and their adjacent bearing plates 49, secure the shaft against sidewise movement.

Figure 9:
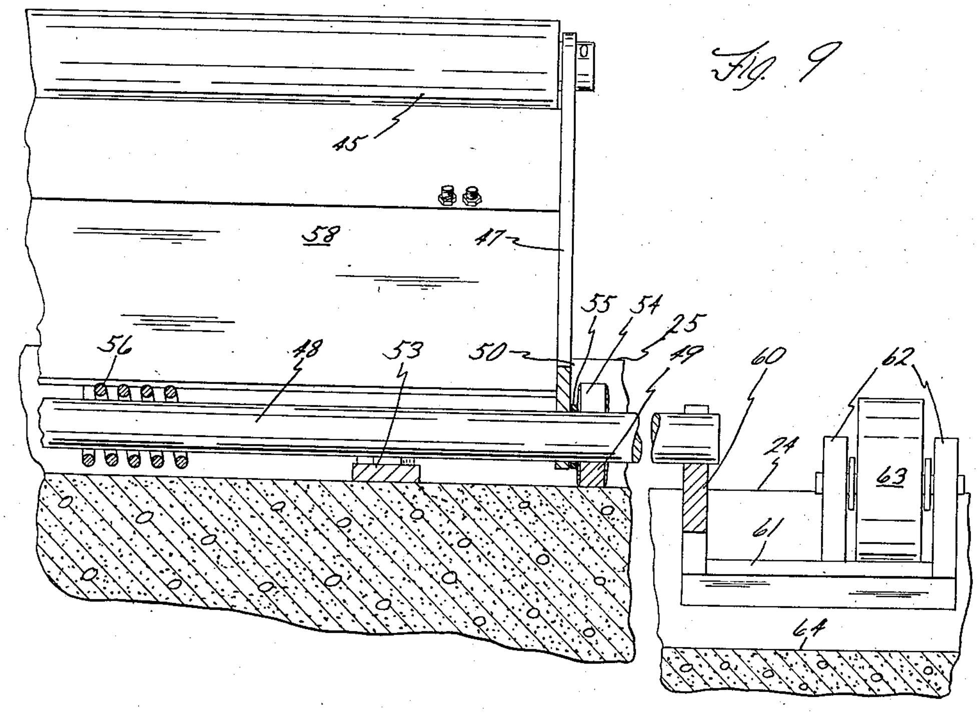
Figure 9 is a reduced sectional view taken substantially on the line 9—9 of Figure 8.
Figure 10:
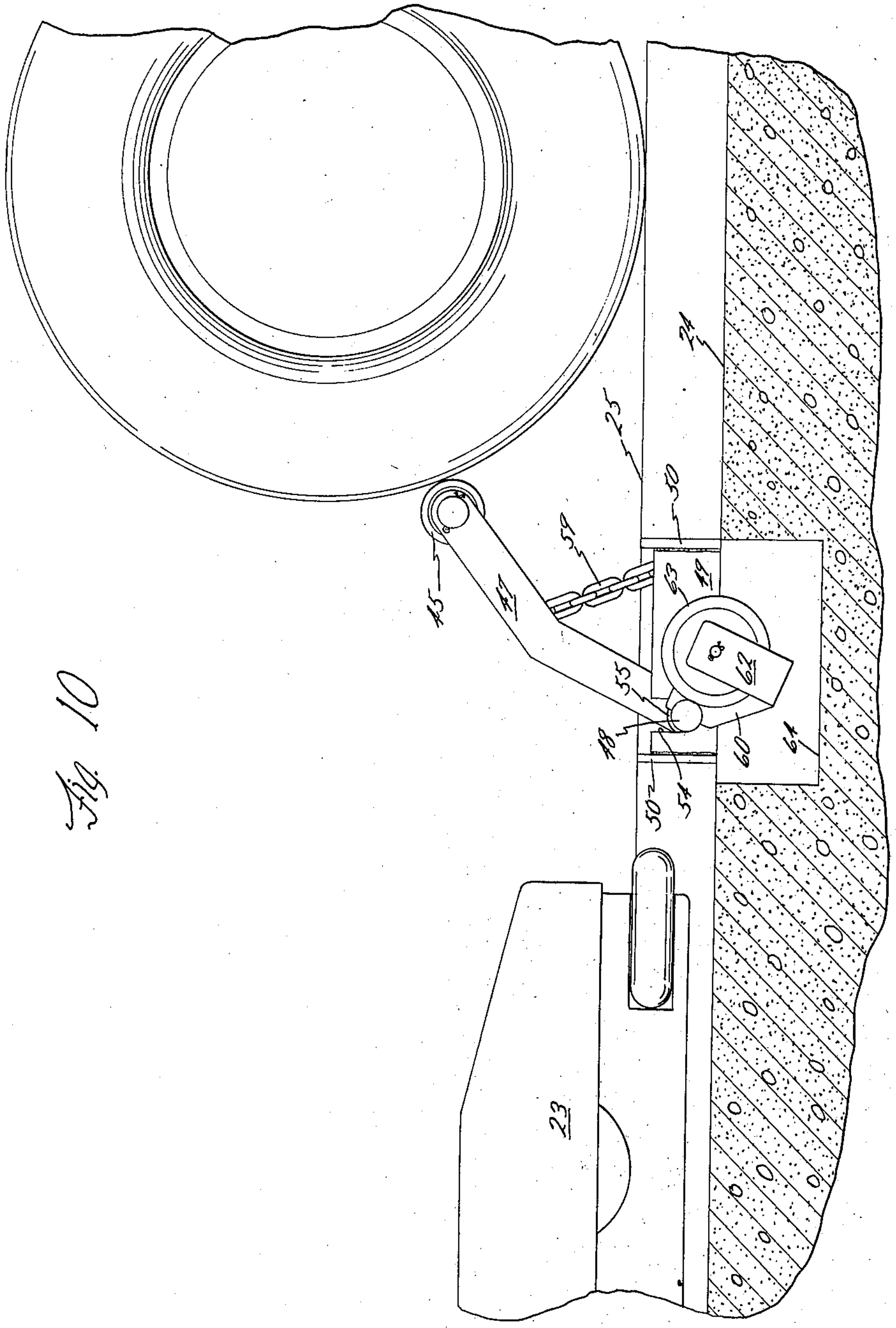
Figure 10 is a sectional view similar to Figure 7 except illustrating a shuttle vehicle about to activate the chock device.

The chock roller 45 is held in the raised position shown in Figures 8, 9 and 10 by a coil spring 56 which is positioned on the shaft 48. One end of the spring 56 is held by a spring stop 57 fixed to the front frame member 50 and the other end bears against the underside of a bracing plate 58 welded between the arms 46 and 47. The pressure of the spring 56 causes the shaft 48 to rotate in the notches 54 and raise the arms 46 and 47 upward. The height to which the arms 46 and 47 may raise is limited by a pair of retaining chains 59 fixed between the bracing plate 58 and the rear frame member 50.

When the chock rollers 45 are in the raised position as indicated in Figure 10, it prevents the wheels of a vehicle from passing, thereby causing the vehicle to stop short of the elevator pit 22 and in proper position to be loaded by the shuttle 23. However, when the shuttle 23 has passed beneath the vehicle and lifted it a few inches from the floor for transport, it is necessary that the roller 45 be lowered to allow the wheels of the vehicle to pass over it. To accomplish this, the end of the shaft 48 which extends into the trench 24, is provided with a crank arm 60. The arm 60 carries at its free end an activating wheel mounting plate 61 which extends outwardly from the shaft 48. The mounting plate 61 has upstanding ears 62 thereon which rotatably mount between them an activating wheel 63. A depression 64 in the bottom of the trench 24 receives the members 60—63 and permits pivotal movement thereof.

Figure 11:
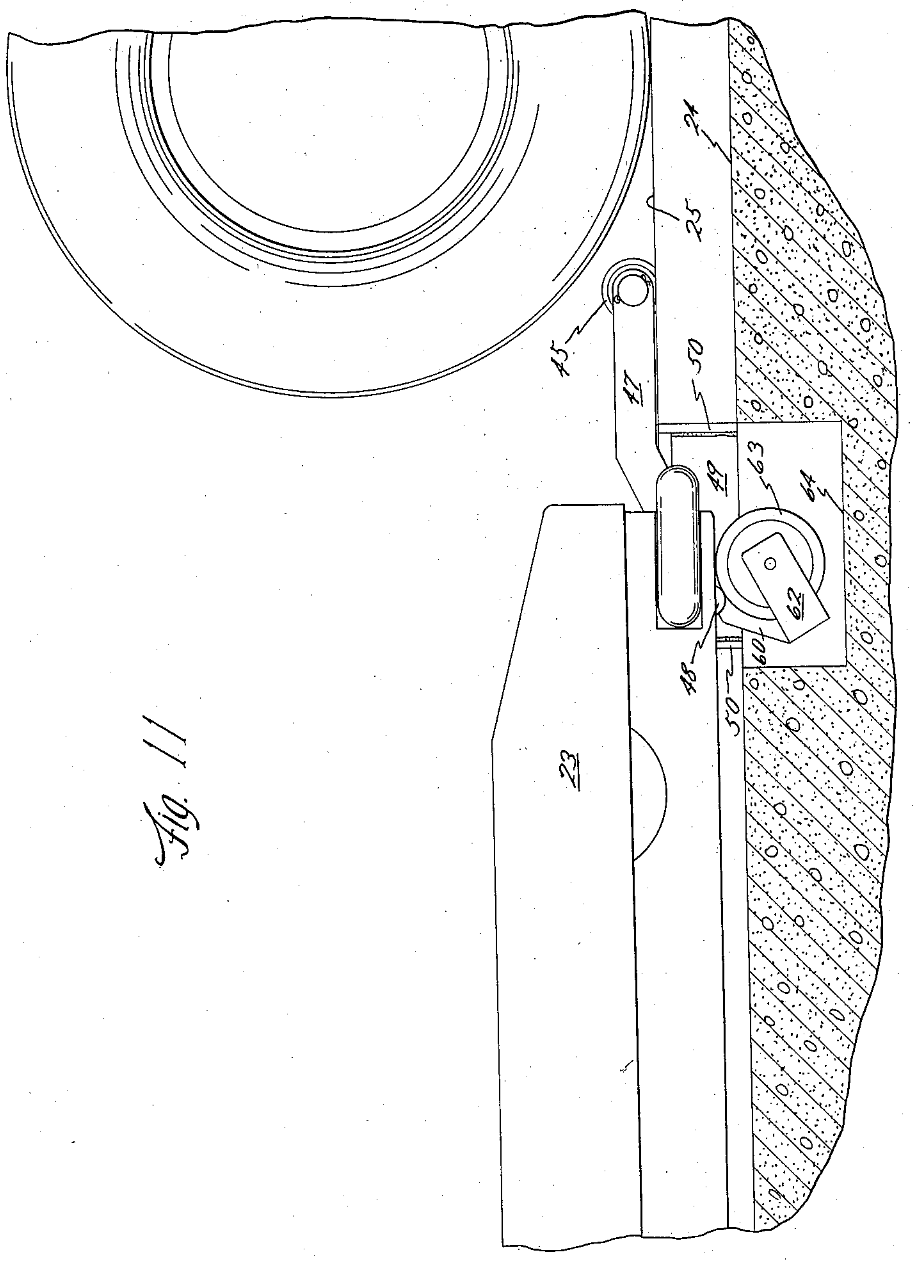
Figure 11 is a view similar to Figure 10 except illustrating the shuttle vehicle depressing the chock device.

As best shown in Figures 10 and 11, the top surface of the activating wheel 63 is positioned a short distance above the bottom of the trench 24 when the roller 45 is raised. However, when the shuttle 23 enters the trench 24 from the elevator, its bottom surface contacts the periphery of the activating roller 63 and depresses it. This action causes the crank arm 60 to pivot and rotate the shaft 48 to lower the arms 46 and 47 and the roller 45. During the time that the shuttle 23 is in the trench 24, its weight on the roller 63 keeps the chock roller 45 lowered. When the roller 45 is in the lowered position, it rests upon a rubber cushion 65 set in a shallow slot 66 in the concrete of the space 25. The total height of the roller 45 when resting on the cushion 65 is less than the distance which the shuttle 23 raises the wheels of the vehicle from the floor, so the wheels are not obstructed.

As soon as the shuttle 23 has passed out of the trench 24 and onto the elevator, the spring 56 elevates the roller 45 to its raised position so as to stop the next vehicle guided over the trench 24. This construction provides complete protection from possible entry of a vehicle into the pit 22, since the chock rollers 45 block the spaces 25 at all time except when a shuttle 23 is in the trench 24. When the shuttle 23 is in the trench 24, there is no necessity for protection since the elevator is in place in front of the trench 24 and blocks the pit 22.

My invention provides an efficient and entirely automatic vehicle aligning device for mechanical parking devices. A vehicle driven toward one of the trenches 24 with reasonable accuracy, will automatically be aligned with the trench 24 as it enters the spaces 25 by means of the guide 30, roller assemblies 36, 41 and 42, and the deflection rollers 43. This alignment is accomplished without damage to the tires of the vehicles since the tire engaging surfaces are either freely rotatable roller surfaces or smooth metal guide walls. The wheel chock devices 44 at the front of the spaces 25 stop the vehicle in the correct position for loading and protect against damage from passing into the pit 22. The chock rollers 45 are lowered automatically to allow the auto to be transported to or from the elevator, and return to raised position as soon as the vehicle is transported.

It is believed that the foregoing description clearly discloses the nature and advantages of my invention.

Having thus described my invention, I claim:

1. In a floor space having lanes for vehicle wheels, a wheel chock device to stop the vehicles comprising a supporting frame seated in a depression in one of the lanes, a transversely extending shaft rotatably mounted on said frame, a pair of spaced apart radial arms fixed on said shaft, a chock member mounted between the free ends of the arms, said chock member being raised and lowered upon rotation of the shaft, spring means connected to the shaft operable to urge the chock member to the raised position, a crank arm secured to one end of the shaft, and an activating roller rotatably mounted on said crank arm, said crank arm operable to lower the chock member upon depressing the activating roller.

2. In a floor space having lanes for vehicle wheels, a wheel chock to stop the vehicles comprising a frame seated in a depression in one of the lanes, a transverse shaft rotatably mounted on said frame, a pair of spaced apart radial arms fixed to said shaft, a chock roller rotatably mounted between the free ends of said arms, said roller being raised and lowered by the arms upon rotation of the shaft, a coil spring on the shaft and connected to the frame operable to urge the chock roller to the raised position, flexible connecting members secured between the frame and the arms to limit the height to which the roller may be raised, a crank arm secured to one end of the shaft, and an activating roller rotatably mounted on said crank arm, the crank arm being operable to lower the chock roller upon depressing the activating roller.

3. In a mechanical parking device having a plurality of parking stalls and a lobby and having means including a shuttle vehicle to carry automobiles from the lobby to said stalls, the improvement comprising a shuttle lane in the lobby, vehicle wheel lanes straddling said shuttle lane, a depression in one of said vehicle wheel lanes, a chock member mounted in said depression and operable to raise and lower with respect to the wheel lane, means connected to the chock member and urging the chock member into raised position, and crank means connected to the chock member operable to lower the chock member on actuating the crank means, said crank means being offset from the chock member, and means on the shuttle to depress the crank means when the shuttle moves beneath an auto having its wheels in said wheel lanes.

4. In a mechanical parking device having a plurality of parking stalls and a lobby and having means including a shuttle vehicle to pick up cars from the lobby and carry them to the stalls, the improvement comprising vehicle wheel lanes in the lobby, a depression in one of said wheel lanes, a chock member mounted in said depression and operable to raise and lower with respect to the wheel lane, means connected to said chock member urging it into raised position, and crank means connected to said chock member and operable to lower the chock member on depressing the crank means, said crank means being offset from the vehicle wheel lanes, and means on the shuttle to depress the crank means when the shuttle moves beneath a vehicle having its wheels in the wheel lanes.

5. In a mechanical parking device having a plurality of parking stalls and a lobby and having means including a shuttle vehicle to pick up cars from the lobby and carry them to the stalls, the improvement comprising a shuttle lane in said lobby, vehicle wheel lanes straddling said shuttle lane, a depression in one of said wheel lanes, a chock member mounted in said depression and operable to raise and lower with respect to the wheel lane, means connected to the chock member and urging the chock member into raised position, and crank means connected to the chock member and operable to lower the chock member on depressing the crank means, said crank means being positioned in the shuttle lane and depressed by the shuttle when it moves beneath a vehicle having its wheels in the wheel lanes.

6. In a mechanical parking device having a plurality of parking stalls and a lobby and having means including a shuttle vehicle to pick up cars from the lobby and carry them to the stalls, the improvement comprising vehicle wheel lanes in the lobby, a depression in one of said wheel lanes, a frame mounted in said depression, a transverse shaft rotatably mounted in said frame, a chock member fixed to said shaft and operable to be raised and lowered with respect to the wheel lane upon rotation of the shaft, means urging the chock member into raised position, crank means fixed to said shaft and operable to lower the chock member upon actuating the crank means, the crank means being offset from the vehicle wheel lane, and means on the shuttle to actuate the crank means when the shuttle moves beneath a vehicle having its wheels in the wheel lanes.

7. In a mechanical parking device having a plurality of parking stalls and a lobby and having means including a shuttle vehicle to transport vehicles from the lobby to said stalls, the improvement comprising a shuttle lane in the lobby, vehicle wheel lanes straddling the shuttle lane, a depression in one of said wheel lanes, a frame in the depression, a transverse shaft rotatably mounted in the frame, a chock member fixed to the shaft and extending substantially radially therefrom, said chock member being raised and lowered with respect to the wheel lane upon rotation of the shaft, means urging the chock member into raised position, means to limit the height to which the chock member can be raised, a crank arm secured to the shaft, and an actuating roller rotatably mounted on the crank arm, the actuating roller being positioned in the shuttle lane and operable to be depressed upon engagement with the shuttle whereby to lower the chock member.

8. In a mechanical parking device having a plurality of parking stalls and a lobby and having means including a shuttle vehicle to pick up cars from the lobby and carry them to the stalls, the improvement comprising vehicle wheel lanes in the lobby, a depression in one of said wheel lanes, a chock member mounted in said depression and operable to raise and lower with respect to the wheel lane, means connected to said chock member urging it into raised position, means to limit the height to which the chock member may be raised, a crank arm fixed to the shaft and spaced from the chock member, an actuating roller mounted on the crank arm, and means on the shuttle to engage the actuating roller and actuate the crank arm to lower the chock member when the shuttle moves beneath a vehicle having its wheels in the wheel lane.

9. In a floor space having lanes for vehicle wheels, a wheel chock device to stop the vehicles comprising a supporting frame seated in a depression in one of the lanes, a transversely extending shaft rotatably mounted on said frame, a chock member carried by the shaft, said chock member being raised and lowered upon rotation of the shaft, spring means connected to the shaft operable to urge the chock member to the raised position, a crank arm secured to one end of the shaft, and an activating roller rotatably mounted on said crank arm, said crank arm operable to lower the chock member upon depressing the activating roller.

10. In a floor space having lanes for vehicle wheels, a wheel chock to stop the vehicles comprising a frame seated in a depression in one of the lanes, a transverse shaft rotatably mounted on said frame, a chock member fixed to the shaft and extending substantially radially therefrom, said chock member being raised and lowered above the floor upon rotation of the shaft, a coil spring on the shaft and connected to the frame and operable to urge the chock member into raised position, a flexible connecting member secured between the frame and the chock member to limit the height to which the chock member may be raised, a crank arm secured to one end of the shaft, and an activating roller rotatably mounted on the crank arm and positioned beside the vehicle wheel lane, the crank arm being operable to lower the chock roller upon depressing the activating roller.

References Cited in the file of this patent

UNITED STATES PATENTS

| | | |
|---|---|---|
| 1,726,724 | Warren | Sept. 3, 1929 |
| 1,977,785 | Wheelock | Oct. 23, 1934 |
| 2,085,329 | Porte | June 29, 1937 |
| 2,229,776 | Steinhorn | Jan. 28, 1941 |
| 2,528,790 | Scherer | Nov. 7, 1950 |
| 2,607,536 | White | Aug. 19, 1952 |
| 2,623,759 | Forbas | Dec. 30, 1952 |
| 2,699,266 | Maurice | Jan. 11, 1955 |

FOREIGN PATENTS

| | | |
|---|---|---|
| 712,397 | Great Britain | July 21, 1954 |